United States Patent [19]

Franzl

[11] 3,958,612

[45] May 25, 1976

[54] PRODUCTION OF GALVANIC PRIMARY CELLS

[75] Inventor: Alois Fränzl, Ellwagen, J., Germany

[73] Assignee: Varta Batterie Aktiengesellschaft, Hannover, Germany

[22] Filed: May 17, 1974

[21] Appl. No.: 470,863

[30] Foreign Application Priority Data

May 24, 1973 Germany............................ 2326460

[52] U.S. Cl. .................................. 141/12; 141/102; 136/175
[51] Int. Cl.² ...................... B65B 1/04; H01M 6/00
[58] Field of Search........................ 136/175; 53/36; 141/263, 11, 12, 81, 102

[56] References Cited
UNITED STATES PATENTS

| | | | |
|---|---|---|---|
| 1,570,916 | 1/1926 | Olaneta.............................. | 136/175 |
| 2,962,844 | 12/1960 | Orlando et al...................... | 136/175 |

FOREIGN PATENTS OR APPLICATIONS

| | | | |
|---|---|---|---|
| 866,936 | 3/1971 | Canada.............................. | 136/175 |

*Primary Examiner*—Donald L. Walton
*Attorney, Agent, or Firm*—Weiser, Stapler & Spivak

[57] ABSTRACT

The method of producing galvanic primary cells including introducing an overdosage of depolarizer mass into a prepressing form and compressing the mass to constant density, forming a pressed depolarizer element by pressing an overdosage of the depolarizer mass into a cell cup through a nozzle, separating the overdosage from the depolarizer element within the cell cup along a predetermined line and allowing the overdosage to remain within the nozzle, pushing the overdosage into the following cell cup as a mass plug and adding sufficient additional depolarizer mass to nozzle to provide an overdosage. The invention also includes the apparatus for carrying out the method including a prepressing form to contain an excess of depolarizer mass, a dosage nozzle in communication with the form and receiving compressed depolarizer mass therefrom, a first ram pushing depolarizer mass into the nozzle and into a cell cup, a second ram forcing the cell cup into the nozzle for dosage application, and a separating device to move the cell cup relative to the nozzle whereby a depolarizer element can be formed within the cell cup and the excess depolarizer mass remains in the nozzle for subsequent feeding into the following cell cup.

19 Claims, 6 Drawing Figures

PRODUCTION OF GALVANIC PRIMARY CELLS

BACKGROUND OF THE INVENTION

The invention relates to a method and apparatus for producing galvanic primary cells, utilizing direct pressing of the depolarizer mass into a cup-shaped negative electrode.

During the production of galvanic primary cells according to the paperlining method, either a pressed element of depolarizer mass is brought into a lined zinc cup, or the depolarizer mass is pressed into the zinc cup after being proportioned in a mold (matrix).

For the manufacture of preformed elements, the depolarizer mass is conveyed via a controllable vibratory feed into a mold, in which it is slightly pre-compressed by a hammer device and then pushed into the mold (matrix) by a molding ram.

The quantity fed into the mold is overdosed by about twenty percent, so that the weight and density of the pressed element is within weight and density tolerances after having gone through the pressing and elongation operations. After removal from the mold (matrix), the pressed element, now called a dolly, is transported to the coiling machine by a so-called dolly-conveyor.

During the subsequent manufacturing process, the molded element is pressed again in the electrode cup.

To insert the molded element with its envelope into the cup without damage, its diameter must be slightly smaller than the inner diameter of the cup. Otherwise, paper tears within the coil can easily develop during subsequent pressing-in. Also the capacity is limited by the fact that the density of the depolarizer mass decreases toward the bottom of the cup.

In utilizing this method, relatively large variations in dosage can occur, as well as loss or backflow of the mass due to overdosing.

If the depolarizer mass is inserted into the lined zinc cups, considerable variations in dosage also occur due to uncompensated predosing. Again, the capacity is limited by the unequal density of the depolarizer.

SUMMARY OF THE INVENTION

It is therefore an object of the invention to develop a method which provides precise and loss-free dosage of depolarizer in the cup, while keeping weight and density within tight tolerances, despite the relatively unprecise preproportioning of the mass. Apparatus for performing this method is also to be provided.

These and other objects which will appear are attained, according to the invention as follows. By overdosage of the depolarizer mass, compressed to constant density, a pressed depolarizer element is produced which protrudes above the cell cup. A portion of this depolarizer is severed at a determined level within the cup. This portion is inserted into the following cup as a mass plug, and is there pressed together with additional depolarizer mass.

In one embodiment of the invention the depolarizer mass of the negative electrode is pressed into the cell cup through a dosage nozzle which extends into the cup. That part of the pressed depolarizer element which remains in the nozzle, due to overdosing, is separated from the cup together with the nozzle.

One form of apparatus for practicing the method, according to the invention, comprised a dosing nozzle held stationary between two rams which are moval axially relative to each other. Between the nozzle and the lower ram, there is a holder for the cell cup and a drive roller, or some other skim - or tear-off arrangement.

The method of the invention as well as the apparatus for practicing same are described further with reference to the accompanying drawings, wherein

BRIEF DESCRIPTION OF THE DRAWINGS

The same reference numerals denote similar elements in the various figures.

DESCRIPTION OF THE PREFERRED EMBODIMENT OF THE INVENTION

Figure 1:
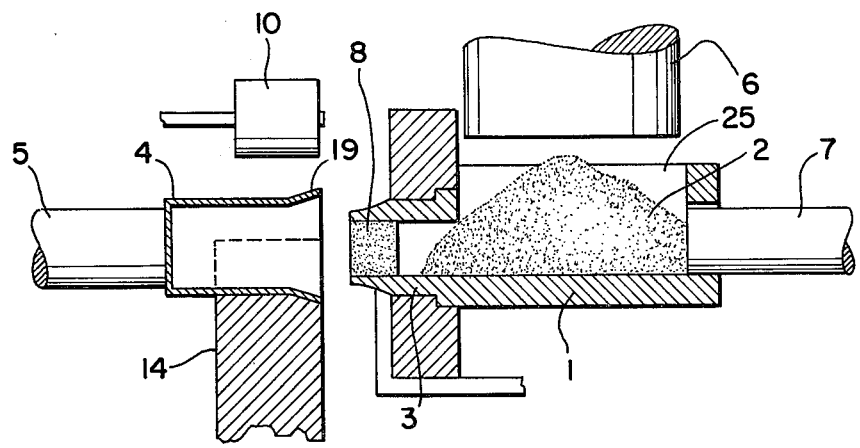
FIGS. 1, 2 and 3 show the apparatus in accordance with the invention at various stages of its operation.

Referring now to the drawings, FIG. 1 shows the apparatus in the initial dosage position. In the pre-pressing form 1, the piled-up depolarizer mass 2 can be seen. When the hammer device 6 is lifted, the loose mass to be compressed falls out of a dosage channel of a vibratory dosing arrangement into the filler opening 25 of the pre-pressing form 1. Depending upon the strength of the vibration, more or less mass 2 can be supplied to the pre-pressing form 1. Preferably, sensing fingers (not shown) are used to control the mass supply in a manner to sense the height of the mount of material which is piled above the pre-pressing form 1. During initial proportioning, the volume of the depolarizer mass 2 amounts to approximately 120 to 125 percent of the internal volume of a zinc cup 4. The overflow remains in the middle section of dosage nozzle 3.

During all subsequent proportionings, the amount of the piled-up depolarizer mass 2 corresponds to the internal volume of cell cup 4. A proportion tolerance of ± 3 g. is permissible.

Figure 2:
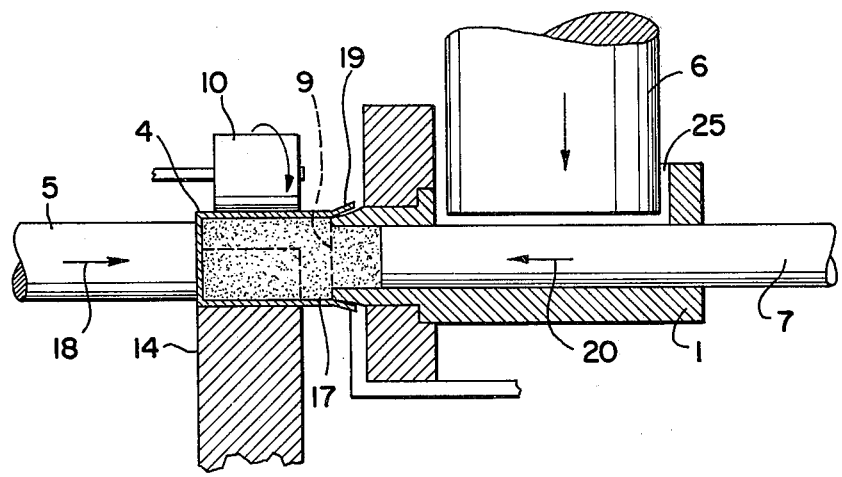

FIG. 2 shows the apparatus in pressing position. The cell cup 4 is lined with a separator paper 17 and is positioned on a holding device 14. The cell cup 4 is pushed by the lower ram 5 in the direction of the arrow 18 until its flared lip 19 engages dosage nozzle 3 and is rotationally stopped thereby. The piled mass 2 is pressed into the cell cup 4 through the dosage nozzle 3 by the upper ram moving in the direction of the arrow 20, after being equally distributed by a hammer device 6. After the first pressing operation as indicated by the movement of the upper and lower rams 7, 5 in the direction of the arrows 20, 18, the surplus of the mass remains in the dosage nozzle 3 and is urged, during the following dosage operation, into the bottom of the cell cup 4 as a mass plug 8. In this manner, a high density of the depolarizer can be obtained also in the lower part of the cell.

Variations in volume will occur due to uneven mass properties and possible variations in dosage in the predosing stage. The degree of density would therefore depend on the volume. In order to always obtain the same density, the upper ram 7 is spring mounted as an elastic member. By appropriate pressure application which is transferred by the upper ram, the desired density or compression can be obtained independently of volume. By employing cushioning means 15 in association with the upper ram 7, a relatively constant pressure can be attained during the compressing operation of the depolarizer mass into the cell cup 4, despite the inequality of the pre-dosage. The tolerance range of the compression can be determined by the arrangement and resistance of the cushioning means 15.

In the final phase of the pressing operation, the pressed depolarizer element is separated from the depolarizer mass which remains in the nozzle 3 along the line 9. This may be performed by rotation of the cell cup 4 or by use of another known type of breaking off arrangement.

Figure 3:
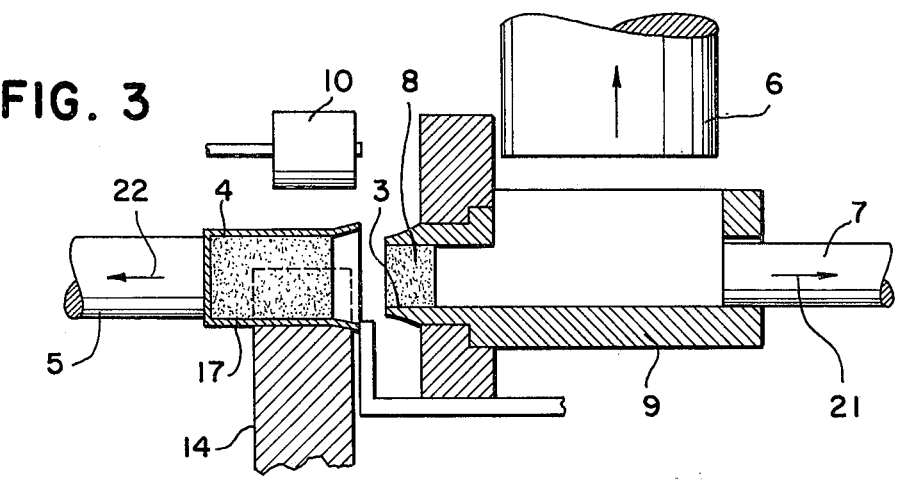
Figure 6:
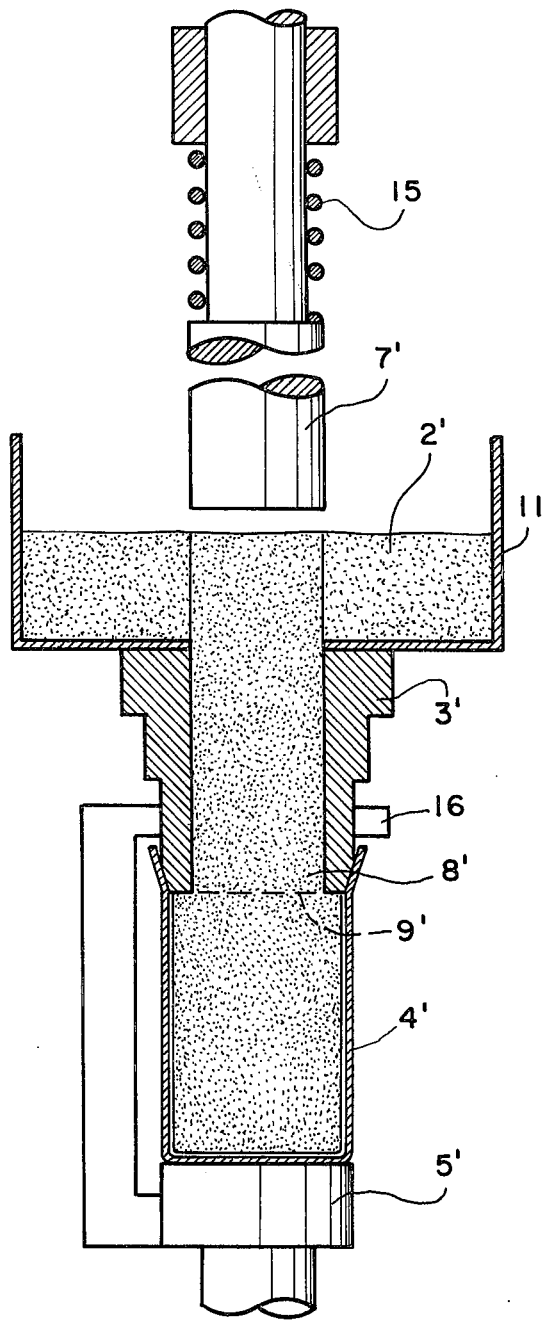

A rotatable friction roller 10 is provided to produce the rotation of the cell cup 4 by moving the roller into engagement with the side of the cell cup 4 after function of the lower ram 5 in the direction of the arrow 18 to the filling position (FIG. 2). It is also possible to provide a breaking off arrangement 16 (FIG. 6). After the separation procedure, the cell cup 4 and the nozzle 3 are separated by movement of upper and lower rams 7, 5 in the direction of the arrows 21, 22 (FIG. 3). The upper part of the pressed depolarizer element remains in the nozzle 3 as a mass plug 8.

At constant geometric conditions of the cell cup 4 and the nozzle 3, the depolarizer element in the final phase of the pressing operation, is always separated at the same point of the cell cup along the line 9, and in this manner, an optimal equality of weight is consistently obtained. By rotation of the cell cup 4, a rotation is also imparted to the portion of the depolarizer plug which is pressed therewithin, whereas the portion of the depolarizer mass remaining in the dosage nozzle 3 remains at rest. This creates shearing forces between the two portions of the depolarizer plug at the surface determined by the shape of the dosage nozzle 3. The surfaces along which the shear forces act corresponds to the line 9. (FIG. 2). These shear forces preduce the so-called tear-off of mass by which the depolarizer plug is separated at the level of line 9.

Figure 4:
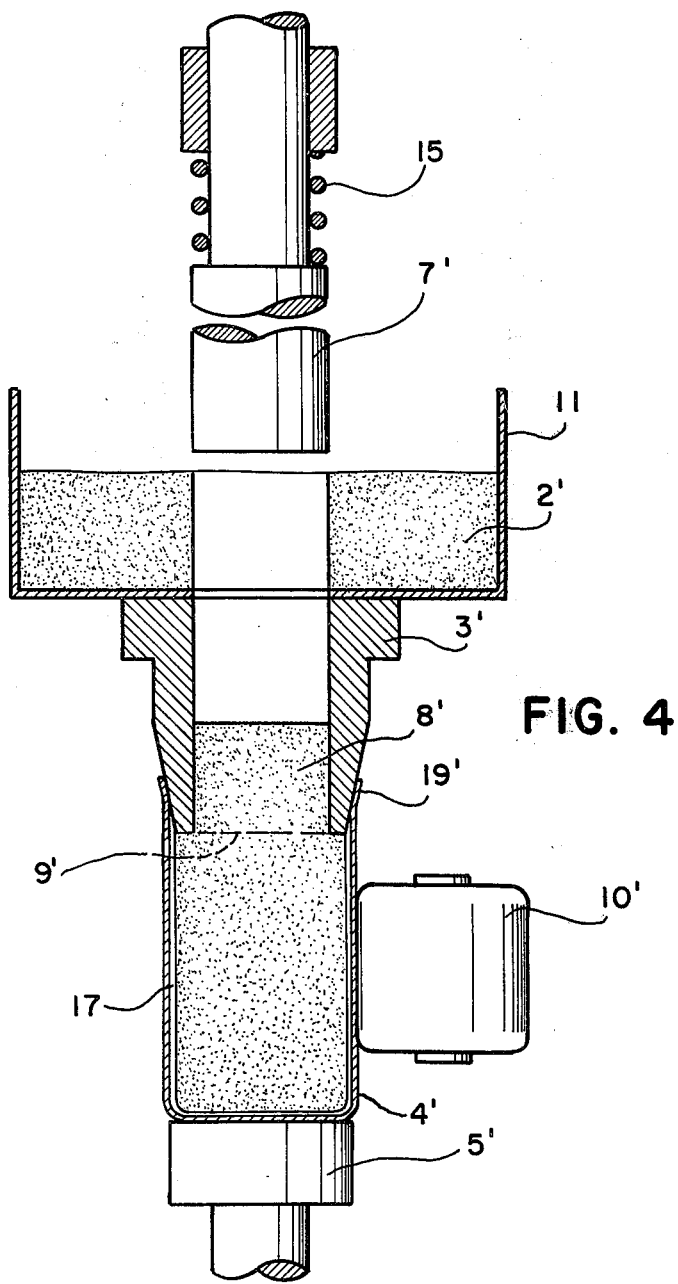
FIGS. 4 – 6 shows an embodiment providing continuous operation by means of a rotary arrangement.
Figure 5:
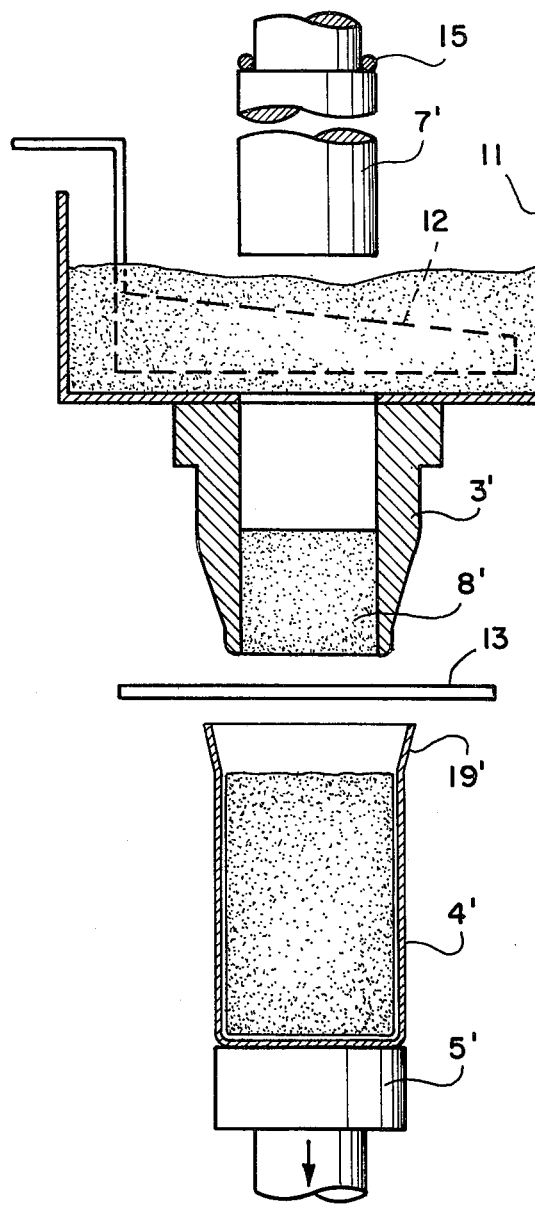

FIGS. 4, 5 and 6 show the device employed for a direct dosage in a continuously running, rotary arrangement. The piled depolarizer mass 2' is delivered to the nozzle 3' over a revolving ring dosage disc 11 which is provided with a fixed dosage wing 12 (FIG. 5). The sequence of the process steps is illustrated in the order of FIG. 6, FIG. 4, FIG. 5.

Since the depolarizer mass 2, generally has a very unequal granulation, several minimal dosages can occur successively. In a preferred embodiment of this device, an extended tolerance range of the volume after pressing in the nozzle is provided.

By increasing the normal dosage, the volume after pressing of the mass plug 8' can be kept near the upper tolerance limit. Thus, several minimal dosages can occur successively, without reaching the lower tolerance limit of the volume in the nozzle 3' after pressing.

After the completed pressing operation of the upper and lower rams 7', 5' as in FIG. 6 and separation of the mass plug 8' as in FIG. 4, a shutter 13 (FIG. 5) is introduced into the gap between the nozzle 3' and cell cup 4' so that dropping mass particles cannot fall into the cell cup. For dosage control, the use of a regulating device (not shown) is also possible.

Separation of the mass plug 8' is performed by rotation of the cell cup 4 driven by a friction roller 10', as shown in FIG. 4. Alternatively, the mass plug 8' is separated by movement of scraper 16, which pulls cell 4' away from nozzle 3', as shown in FIG. 6. Upon operation of the scraper arrangement 16, the cell cup 4' is displaced together with the portion of the depolarizer plug 8' contained within the cup. The portion of the depolarizer plug 8' present in the dosage nozzle 3' remains at rest during function of the scraper 16. In this manner, the depolarizer plug is axially pulled at the level of line 9' and is separated.

The advantages achieved by the invention arise from better quality of cells, in which the volume is used more advantageously through better distribution of the mass during the stepwise pressing operations. The invention also permits reduced tolerances of weight and more efficient production. More uniform quality can be maintained due to the reduced weight tolerance.

An efficient method of production becomes possible through continuous consumption of the over-dosage in the subsequent pressing operation without mass overflow.

I claim:

1. In the method of producing galvanic cells which includes pressing a predetermined quantity of depolarizer mass through a nozzle into each of a plurality of cell cups adapted to be serially brought into mating engagement with the nozzle, the improvement which comprises:

positioning in the nozzle a first discrete dose of the depolarizer mass which is less than the predetermined quantity, introducing into the nozzle a second discrete dose of the depolarizer mass, and pressing both doses through the nozzle toward a first cell cup in mating engagement with the nozzle.

2. The method of claim 1 wherein the first and second doses together are more than said predetermined quantity, whereby a first portion of the mass becomes positioned within the cell cup while a second portion remains positioned in the nozzle.

3. The method of claim 2 wherein the two doses together exceed the predetermined quantity by approximately 20 to 25 percent.

4. The method of claim 2 wherein the pressing continues until a predetermined quantity of the mass has been introduced into the cup and subjected to a predetermined pressure.

5. The method of claim 2 further comprising separating the mass into the first and second portions.

6. The method of claim 5 further comprising removing the cell cup with the first mass portion positioned therein from engagement with the nozzle.

7. The method of claim 6 further comprising bringing a second cell cup into engagement with the nozzle, the second mass portion remaining therein constituting a first discrete dose of depolarizer mass.

8. The method of claim 7 further comprising repeating the steps of introducing a second discrete dose of depolarizer mass and pressing both doses toward the cell cup while the second cell cup is in engagement with the nozzle.

9. The method of claim 8 further comprising repeating the steps of introducing and pressing, for each one of still other cell cups brought serially into engagement with the nozzle.

10. The method of claim 5 wherein the separating is performed by rotating the cell cup relative to the nozzle.

11. The method of claim 1 wherein the mating engagement between cell cup and nozzle is sufficiently close to substantially preclude escape of depolarizer mass during pressing.

12. The method of production of galvanic cells including the steps of

A. providing an overdosage of depolarizer mass for a cell cup;

B. introducing a portion of the mass into a cell cup to form a usable portion and an oversized portion;
C. compressing the depolarizer mass to constant density to form a pressed depolarizer element;
D. revolving the cell cup to separate the oversized portion from the usable portion along a predetermined line; and
E. reusing the oversized portion together with additional compressed depolarizer mass to form the usable portion of another depolarizer element.

13. In apparatus for forming galvanic cells having a nozzle, and means for serially bringing cell cups into mating engagement with the nozzle, the nozzle being adapted to contain depolarizer mass:
  ram means constructed and arranged for repetitive insertion into and withdrawal from the nozzle for introducing a discrete dose of depolarizer mass into the nozzle during each insertion and to press it through the nozzle and toward the cup,
  the relationship between the interior of the nozzle and the insertions of the ram means being such that the major portion of the nozzle interior is occupied by the ram means during each insertion,
  whereby an engaged cell cup of size substantially equal to the nozzle interior occupied by the ram has pressed into it depolarizer mass pressed into the nozzle during two consecutive ram insertions.

14. The apparatus of claim 13, further comprising means for positioning the cup so that the nozzle extends partly into the cup.

15. The apparatus of claim 13, whereby the nozzle engaged by a cell cup of size less than the nozzle interior will have in it during one ram insertion depolarizer mass comprising a portion pressed into the cup during the insertion and a portion remaining inside the nozzle after the insertion.

16. The apparatus of claim 15 further comprising means for separating the first and second portions of the pressed mass.

17. The apparatus of claim 16 wherein the separating means comprises means for rotating the cup relative to the nozzle.

18. The apparatus of claim 13 further comprising means positioned to be traversed by the ram before insertion and constructed to contain a quantity of loose depolarizer mass larger than the portion of the nozzle interior occupied by a ram insertion.

19. In an apparatus for forming galvanic cells, which cells comprise a cell cup and depolarizer mass within the cup, the combination of
A. a pre-pressing form to contain an excess of depolarizer mass;
B. a dosage nozzle associated with the form,
  1. said nozzle being positioned to receive depolarizer mass from the form;
C. first ram means movable through the form from a first position to a second position to press a quantity of depolarizer mass into the nozzle;
D. second ram means to force a cell cup partially over the nozzle
  1. the said nozzle defining a separation line within the cell cup when the cup is positioned partially over the nozzle; and
E. separation means to move the cell cup relative to the nozzle to separate the usable portion from the oversized portion;
  1. the separation means being movable from an initial non-separation position to a separation position; and
  2. the separation means including a friction roller to rotate the cell cup when in the said separation position.

* * * * *